(12) United States Patent
Ward

(10) Patent No.: US 11,484,132 B2
(45) Date of Patent: Nov. 1, 2022

(54) PORTABLE DISPLAY CABINET FOR TRANSPORT, STORAGE AND DISPLAY OF LIVING ORGANISMS

(71) Applicant: Jim Ward, Zeeland, MI (US)

(72) Inventor: Jim Ward, Zeeland, MI (US)

(*) Notice: Subject to any disclaimer, the term of this patent is extended or adjusted under 35 U.S.C. 154(b) by 487 days.

(21) Appl. No.: 16/527,715

(22) Filed: Jul. 31, 2019

(65) Prior Publication Data

US 2020/0138205 A1 May 7, 2020

Related U.S. Application Data

(60) Provisional application No. 62/755,752, filed on Nov. 5, 2018.

(51) Int. Cl.
| | | |
|---|---|---|
| *A47F 3/00* | (2006.01) | |
| *A47F 5/00* | (2006.01) | |
| *A01K 1/02* | (2006.01) | |
| *G05D 23/19* | (2006.01) | |

(52) U.S. Cl.
CPC ............ *A47F 3/001* (2013.01); *A01K 1/0245* (2013.01); *A47F 5/0081* (2013.01); *G05D 23/1932* (2013.01)

(58) Field of Classification Search
CPC .. A01K 1/0245; A01K 63/003; A01K 1/0047; A01K 1/0076; A01K 63/06; A01K 63/065; A47B 45/00; A47B 46/00; F21S 8/028; F21V 33/0012; F21V 33/0048
USPC .................................................. 206/372, 373
See application file for complete search history.

(56) References Cited

U.S. PATENT DOCUMENTS

| | | | | | |
|---|---|---|---|---|---|
| 1,238,074 | A | * | 8/1917 | Labadie | G09F 5/02 190/17 |
| 1,667,938 | A | * | 5/1928 | Labadie | G09F 5/02 206/373 |
| 1,992,435 | A | * | 2/1935 | Labadie | B25H 3/023 190/17 |
| 3,318,648 | A | * | 5/1967 | Schonenbach | B25H 3/028 312/273 |
| 5,794,567 | A | * | 8/1998 | Itzhak | A01K 63/003 119/416 |
| 5,860,289 | A | * | 1/1999 | Wetzel | A47F 7/0078 62/255 |
| 6,128,912 | A | * | 10/2000 | Wetzel | A47F 3/0447 62/256 |
| 6,810,833 | B2 | * | 11/2004 | Bonner | A01K 1/03 119/452 |
| 9,743,636 | B1 | * | 8/2017 | Casebolt | A01K 29/005 |
| 2010/0265697 | A1 | * | 10/2010 | Fredricks | F21V 21/30 362/101 |
| 2012/0085293 | A1 | * | 4/2012 | Owens | A01K 1/03 119/455 |

(Continued)

*Primary Examiner* — Tien Q Dinh
*Assistant Examiner* — Katelyn T Truong
(74) *Attorney, Agent, or Firm* — Price Heneveld LLP

(57) ABSTRACT

A climate controlled display cabinet includes a frame. A stationary shelf is coupled to the frame. A plurality of operable shelves is coupled to at least one of the frame and the stationary shelf. The operable shelves are moveable between open and closed positions. A heat source is in thermal communication with the stationary shelf and the plurality of operable shelves. At least one temperature sensor monitors a temperature of an area proximate the stationary shelf and the plurality of operable shelves.

18 Claims, 7 Drawing Sheets

(56) References Cited

U.S. PATENT DOCUMENTS

| | | | | |
|---|---|---|---|---|
| 2012/0314418 A1* | 12/2012 | Byrne | ................... | F21S 8/028 |
| | | | | 362/419 |
| 2017/0208940 A1* | 7/2017 | Boudreault | ............... | A47F 3/02 |
| 2017/0232607 A1* | 8/2017 | Michael | .................. | B25H 3/04 |
| | | | | 312/107 |
| 2018/0132320 A1* | 5/2018 | Fredricks | ............... | H05B 45/10 |

* cited by examiner

PORTABLE DISPLAY CABINET FOR TRANSPORT, STORAGE AND DISPLAY OF LIVING ORGANISMS

CROSS-REFERENCE TO RELATED APPLICATION

This application claims priority to and the benefit under 35 U.S.C. § 119(e) of U.S. Provisional Patent Application No. 62/755,752, filed on Nov. 5, 2018, entitled "PORTABLE DISPLAY CABINET FOR TRANSPORT, STORAGE AND DISPLAY OF LIVING ORGANISMS," the entire disclosure of which is hereby incorporated herein by reference.

FIELD OF THE INVENTION

The present invention generally relates to storage cabinets, and more specifically, an operable storage cabinet having heated shelves for the comfortable storage of living organisms.

BACKGROUND OF THE INVENTION

Various display cases are used for the transport and display of a wide variety of products, goods and hobby-related items. These items can include living organisms that require safe and secure storage space for safe transport of these organisms. These living organisms can be displayed at various shows, expositions, and other common-interest events.

SUMMARY OF THE INVENTION

According to one aspect of the present invention, a climate controlled display cabinet includes a frame. A stationary shelf is coupled to the frame. A plurality of operable shelves is coupled to at least one of the frame and the stationary shelf. The operable shelves are moveable between open and closed positions. A heat source is in thermal communication with the stationary shelf and the plurality of operable shelves. At least one temperature sensor monitors a temperature of an area proximate the stationary shelf and the plurality of operable shelves.

According to another aspect of the present invention, a climate controlled display cabinet for displaying living animals includes a frame having a stationary display portion. A plurality of operable display portions is coupled to the frame. The plurality of operable display portions are moveable between open and closed positions. The closed position is defined by the stationary display portion and the plurality of operable display portions enclosed within the frame. The open position is defined by the stationary display portion and the plurality of operable display portions being accessible. A heat source is in thermal communication with the stationary display portion and the plurality of operable display portions. A plurality of temperature sensors are coupled to the stationary display portion and the plurality of operable display portions, respectively. A controller is in communication with the plurality of temperature sensors and the heat source. The controller communicates respective signals from each temperature sensor of the plurality of temperature sensors.

According to another aspect of the present invention, a climate controlled display cabinet includes a frame. A stationary shelf is coupled to the frame. A plurality of operable shelves are coupled to at least one of the frame and the stationary shelf. The operable shelves are moveable between open and closed positions. A heat source is in thermal communication with the stationary shelf and the plurality of operable shelves. Each of the stationary shelf and the plurality of operable shelves includes a heating section of the heat source in the form of electrically resistive tape. At least one temperature sensor is coupled to each of the heating sections. The at least one temperature sensor monitors a temperature of an area proximate a respective heating section of the heating sections. A thermostat is coupled to the frame and in communication with the heat source and the at least one temperature sensor. A controller is in communication with the thermostat and the heat source. The controller operates the heating sections in each of the open and closed positions of the plurality of operable shelves.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
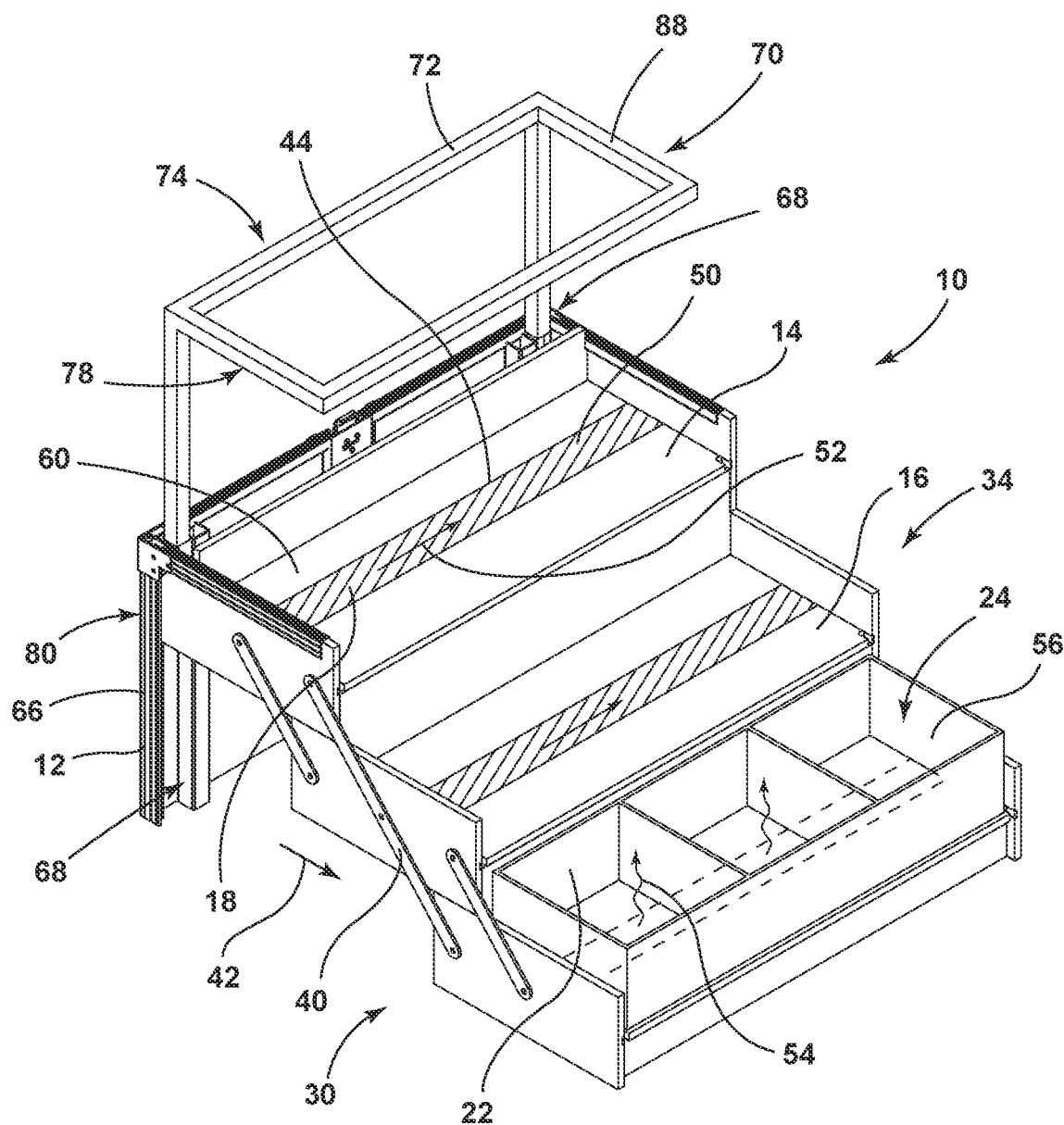
FIG. 1 is a perspective view of an aspect of the portable display cabinet shown in the open position with certain bins removed to show the location of the heating element.
Figure 2:
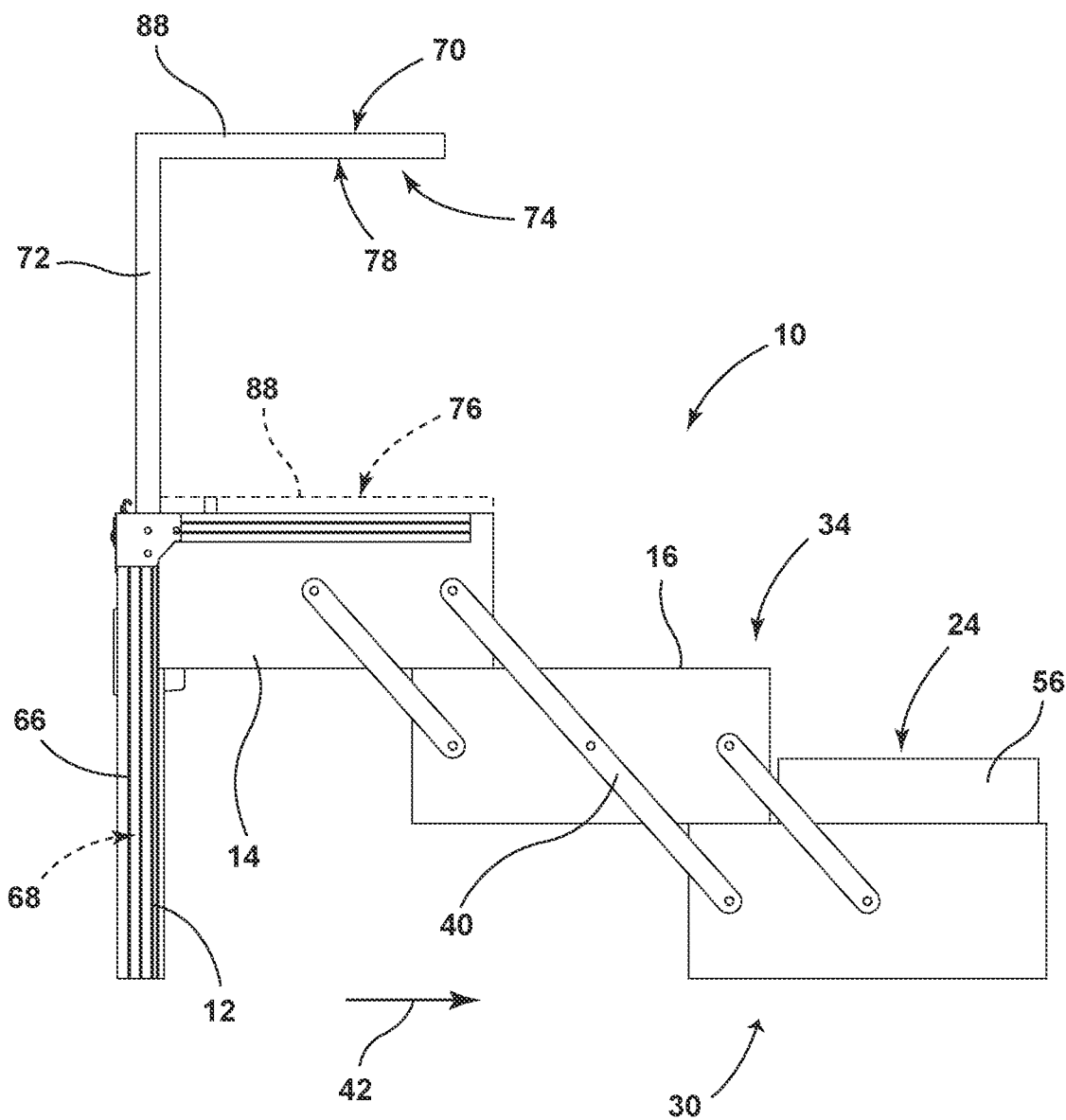
FIG. 2 is a side elevational view of the display cabinet of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-6, reference numeral 10 generally refers to a display cabinet that can be used for the storage of various goods and artifacts. In particular, the display cabinet 10 provides an interior and climate controlled environment for the storage, display and transportation of heat-sensitive items and living creatures. In particular, such living creatures can include endothermy, as well as poikilotherms, ectotherms and other living creatures that are either cold blooded or have wide-ranging internal body temperatures.

According to various aspects of the device, the climate controlled display cabinet 10 for the display of living organisms can include a frame 12 and a stationary display portion, such as a stationary shelf 14, that is coupled to the frame 12. A plurality of operable display portions, such as operable shelves 16, are coupled to at least one of the frame 12 and the stationary shelf 14. A heat source 18 is in thermal communication with the stationary shelf 14 and the plurality of operable shelves 16. A thermostat 20 is coupled to the frame 12 and is in communication with the heat source 18. At least one, and typically a plurality of, temperature sensors 22 for monitoring a temperature of a display area 24 proximate the stationary shelf 14 and the plurality of operable shelves 16 is also included and is in communication with the heat source 18 and the thermostat 20.

Referring again to FIGS. 1-6, the display cabinet 10 is operable between open and closed positions 30, 32. The stationary shelf 14 and the frame 12 cooperate to form a structure that generally supports the display cabinet 10 in each of the open and closed positions 30, 32. A plurality of operable shelves 16 are at least laterally translatable or otherwise moveable between the closed position 32 and the open position 30. In the open position 30, the plurality of operable shelves 16 are moved to a generally stepped configuration 34 with respect to the stationary shelf 14. In the closed position 32, exemplified in FIGS. 5 and 6, the operable shelves 16 are translated into a generally stacked configuration 36, either above or below the stationary shelf 14. In this manner, the various display areas 24 that are at least partially defined by the stationary shelf 14 and the operable shelves 16 include defined spaces within which living organisms can be kept in each of the open and closed positions 30, 32 of the display cabinet 10.

Referring again to FIGS. 1-6, in order to translate the plurality of operable shelves 16 between the closed and open positions 32, 30, a set of linkages 40 can be included. These linkages 40 allow for the lateral translation 42 of the operable shelves 16 from under the stationary shelf 14 to the stepped configuration 34 that is indicative of the open position 30 or the display position where the display areas 24 of the stationary and operable display portions are directly visible and accessible to a user of the display cabinet 10. The linkages 40 exemplified in FIGS. 1-6 are provided as a non-limiting example of how the plurality of operable shelves 16 may operate between the open and closed positions 30, 32. It is also contemplated that various sliding assemblies, laterally-translating assemblies, rotating assemblies and other similar operating mechanisms can be used to move the operable shelves 16 between the open and closed positions 30, 32.

Referring again to FIGS. 1-6, the display cabinet 10 can include the heat source 18 that provides heat 54 to the display areas 24 positioned above the stationary shelf 14 and the plurality of operable shelves 16. This heat source 18 can be in the form of an electrically resistive element 50 through which electrical current 52 can be run to generate heat 54. This heat 54, in turn, radiates in a generally upward direction to heat various bins 56 that are selectively located within the display areas 24 of the stationary shelves and the plurality of operable shelves 16. The display cabinet 10 can include a plurality of display bins 56 that are selectively positioned in the stationary shelf 14 and the plurality of operable shelves 16, respectively. In such an embodiment, each bin 56 of the plurality of display bins 56 are typically in thermal communication with a portion of the heat source 18 for the display cabinet 10.

According to various aspects of the device, the electrically resistive element 50 can be in the form of heat tape, various wire heating elements, and other similar resistive heating mechanisms that can be disposed on the stationary shelf 14 and the operable shelves 16. According to various aspects of the device, the heat source 18 can also be in the form of heat-resistive coatings, heat lamps, and other similar heat sources 18. Typically, the heat source 18 will be a low profile heating element typically in the form of a resistive heating element that can be placed on or within a base panel 60 of each of the stationary shelves of the plurality of operable shelves 16. Electrical and data wiring for operating the various heating elements and temperature sensors 22 can be run through the frame 12 and also through the various linkages 40 that connect the stationary shelf 14 to the plurality of operable shelves 16. Accordingly, the heat source 18 and temperature sensors 22 for the display cabinet 10 can be operable in each of the open and closed positions 30, 32. The heat source 18 for the display cabinet 10 can be divided into a plurality of independent heating sections 44. Each heating section 44 can correspond to a dedicated display area 24 that is positioned within one of the stationary shelf 14 and/or the plurality of operable shelves 16. It is further contemplated that each heating section 44 of the plurality of heating sections 44 can include a dedicated temperature sensor 22 that is in communication with at least the controller 130, the electrical system 80 and the data communications system 112. In this manner, the controller 130, the electrical system 80 and the data communications system 112 can provide independent temperature control. This independent temperature control can be used to establish and maintain the desired climate controlled environment within each of the display areas 24 and the bins 56 located within these display areas 24 of the display cabinet 10, in each of the open and closed positions 30, 32.

By way of example, and not limitation, during transport of various animals, such as reptiles, the health and safety of these animals may require at least minimal amounts of heat 54 being directed into the individual bins 56 and display areas 24 in which the animals are stored during transport. Accordingly, the heat source 18 of the stationary shelf 14 and the plurality of operable shelves 16 is operable in the closed position 32 to provide heat 54 to the individual bins 56 and display areas 24 during times when the display cabinet 10 is in the closed position 32, such as during transport and/or storage. When the display cabinet 10 is moved to the open position 30, which can also be indicative of a display position, the heat source 18 remains operable to continuously provide heat 54 to the individual bins 56 and display areas 24 within the display cabinet 10. By using the heat source 18, the display cabinet 10 provides a self-contained mechanism within which various animals or other living organisms can be displayed, stored and transported. By incorporating the heat source 18 within the self-contained unit in the form of the display cabinet 10, movement and other disruptions that may be experienced by the living organisms, such as transport between a display case and a travel case, can be kept to a minimum. By limiting the amount of movement experienced by the living creatures, various stressful situations can be kept to a minimum and the living creatures can be maintained in a relatively comfortable and secure state.

Referring again to FIGS. 1-4, the display cabinet 10 can also include a lighting structure 70 that is operably coupled to the frame 12. This lighting structure 70 can be in the form of a stanchion 72 that is vertically operable relative to the frame 12 between raised and lowered positions 74, 76. The frame can include corner supports 66 having stanchion channels 68 defined therein. The stanchion 72 of the lighting structure 70 is slidably operable within the stanchion channels 68 to define various vertical positions of the lighting structure 70 including the raised and lowered positions 74, 76. This lighting structure 70 can include a plurality of light fixtures 78 and/or lighting elements such as LEDs, incandescent lights, heat lamps, and other light sources that can be used to display the living organisms kept within the individual display areas 24 defined within the stationary shelf 14 and plurality of operable shelves 16. The lighting structure 70 includes an upper frame 88 that houses the various light sources described herein. The upper frame 88 is configured to allow a user to see through the upper frame 88 and view the stationary shelf 14 regardless of the vertical position of the stanchion 72 for the lighting structure 70. It is contemplated that the lighting structure 70 and the heat source 18 are each maintained in communication with an electrical system 80 for the display cabinet 10. This electrical system 80 can include an external electrical receptacle 82 that can be alternatively powered by an external power source, such as through a plug connected with an electrical outlet. The electrical system 80 can also be powered through a portable power source such as a battery, solar panels, or other similar internal power source. Where the portable power source is utilized, the portable power source of the electrical system 80 can be in communication with the controller 130, the heat source 18 and the at least one temperature sensor 22, as well as other electrical components of the display cabinet 10.

Referring again to FIGS. 1-6, a lid 90 for the display cabinet 10 can be used to cover the stationary shelf 14 as well as the stanchion 72 that forms the lighting structure 70. This lid 90 for the display cabinet 10 can include various storage areas 92 for keeping accessory items related to the care and custody of the living creatures kept within the display cabinet 10. Such display areas 24 can hold food, water, grooming accessories, and other similar items that may be needed during the transport, storage, and display of the living creatures kept within the display cabinet 10.

Using the internal heat source 18 and integral lighting structure 70, the display cabinet 10 allows for a quick and convenient display environment of various products and/or animals within a multi-tier portable and customizable platform. The display cabinet 10 provides options for display lighting as well as power and heat options for maintaining the comfort of living organisms kept within the various bins 56 and display areas 24 of the display cabinet 10. Depending upon the size and scale of the display cabinet 10, wheels can also be disposed within an underside of the display cabinet 10 for convenient transport. By using wheels, bumping and jostling or other movements that may cause stress or annoyance of living organisms can be kept to a minimum during transport of the display cabinet 10. The display cabinet 10 described herein provides for a substantially self-contained display environment that can be customizable for the comfort of various living organisms in each of the open and closed positions 30, 32 of the display cabinet 10. As discussed above, the heat source 18 can be operated in each of the open and closed positions 30, 32 and can be used in connection with external and internal power sources for continuous maintenance of the various display areas 24 at a substantially consistent temperature. By maintaining the temperature of the internal display areas 24, the comfort of the various living organisms can be provided for in a substantially continuous and consistent manner. Using these self-contained and continuously operable features, stresses experienced by the living organisms can be kept to a minimum to ensure the safety and comfort of the living creatures kept within the display cabinet 10.

Referring again to FIGS. 1-4, operation of the plurality of operable shelves 16 can be into a cantilevered or stepped configuration 34 that allows for a convenient set-up operation. The plurality of operable shelves 16 can be rotated or laterally translated from the stacked-closed position 32 to the tiered or cantilevered open position 30 where the internal display areas 24 are easily visible. Additionally, the open position 30 of the display cabinet 10 includes the multi-tier configuration that allows for easy access to the interior display areas 24 and bins 56 within which living organisms can be displayed.

According to various aspects of the device, each of the individual bins 56 include an operable cover 100 that is rotatable between secure and access positions 102, 104. In this manner, the operable cover 100 can be used for the security and protection of the living organisms. The operable cover 100, which is typically clear or translucent, can also help to maintain the temperature of the display environment within which the environment is stored.

As exemplified in FIGS. 3-6, the display cabinet 10 can include a utility panel 110 that is positioned within the frame 12 for the display cabinet 10. This utility panel 110 can include the electrical system 80 and data communications system 112 for the display cabinet 10. This utility panel 110 can include one or more electrical receptacles 82 that can receive electrical power from an external source. Additionally, the display cabinet 10 can include a controller 130 that communicates with the one or more temperature sensors 22 in each of the open and closed positions 30, 32 of the display cabinet 10. In this manner, the controller 130 sends and receives signals from the various components of the electrical system 80 and the data communications system 112 for providing and maintaining the climate controlled environment within the display cabinet 10.

Figure 3:
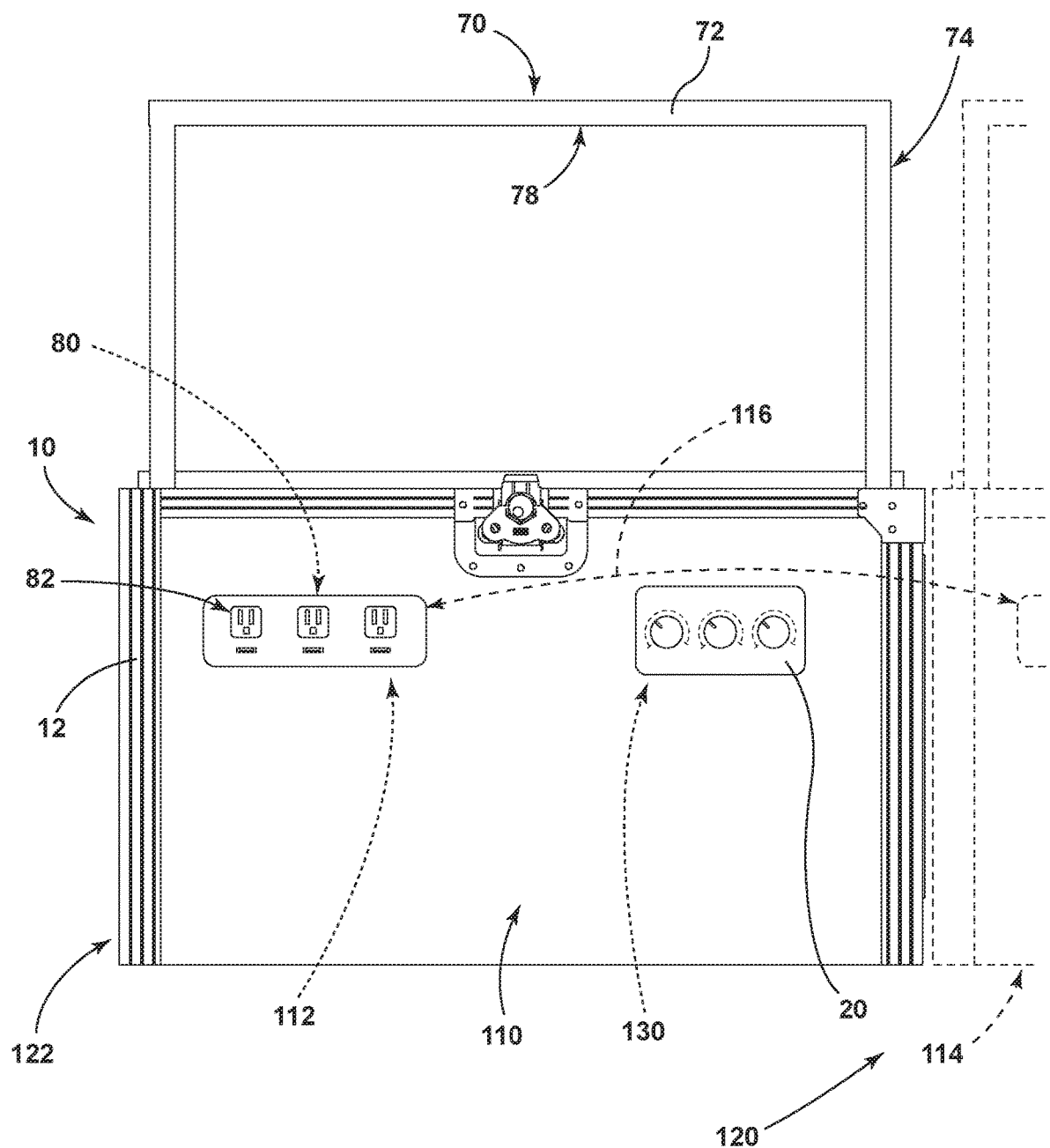
FIG. 3 is a second side elevational view of the display cabinet of FIG. 1.
Figure 4:
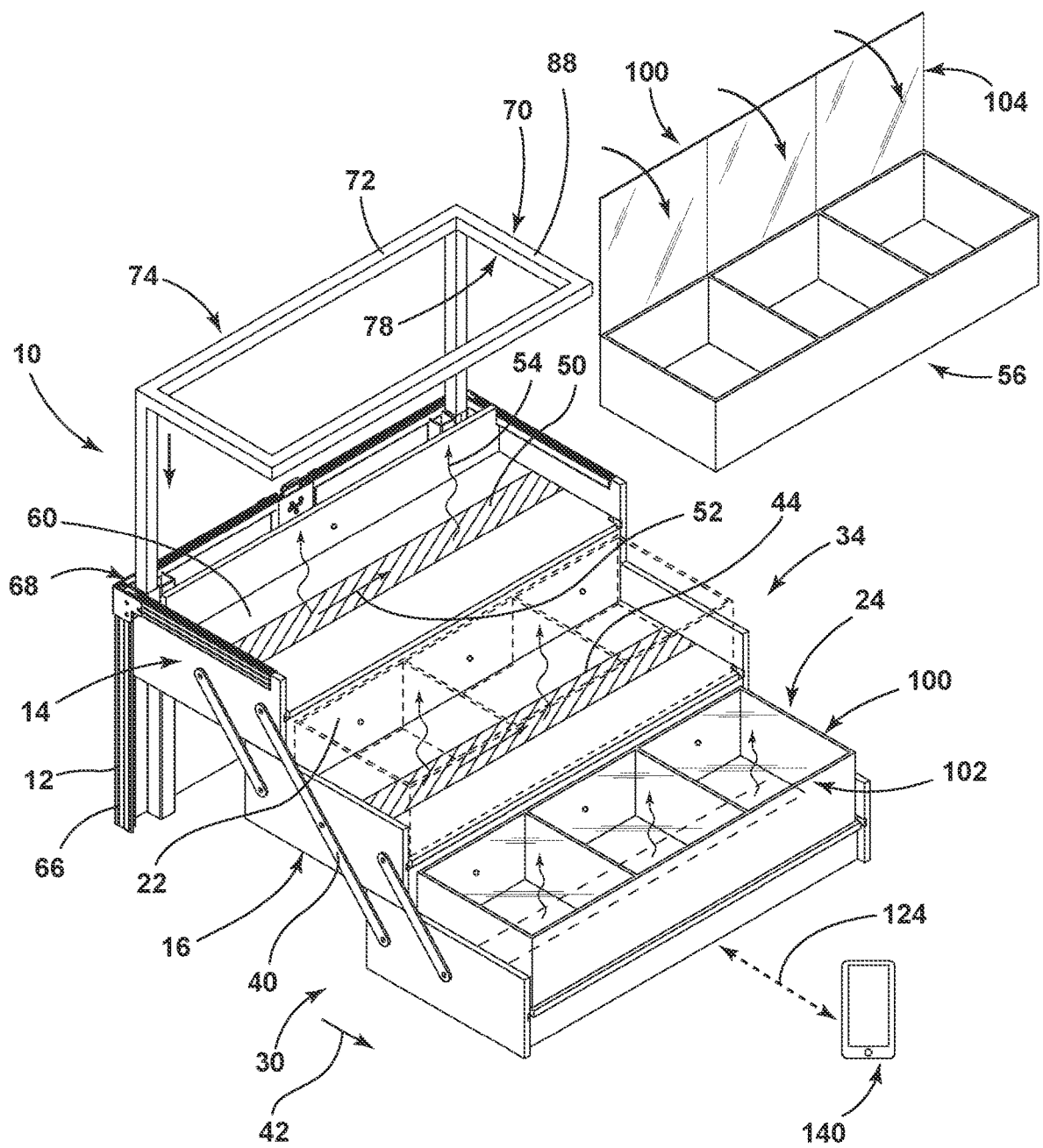
FIG. 4 is a perspective view of an aspect of the display cabinet showing various features of the heating element and the individual display bins that can be set upon the heated shelves.
Figure 5:
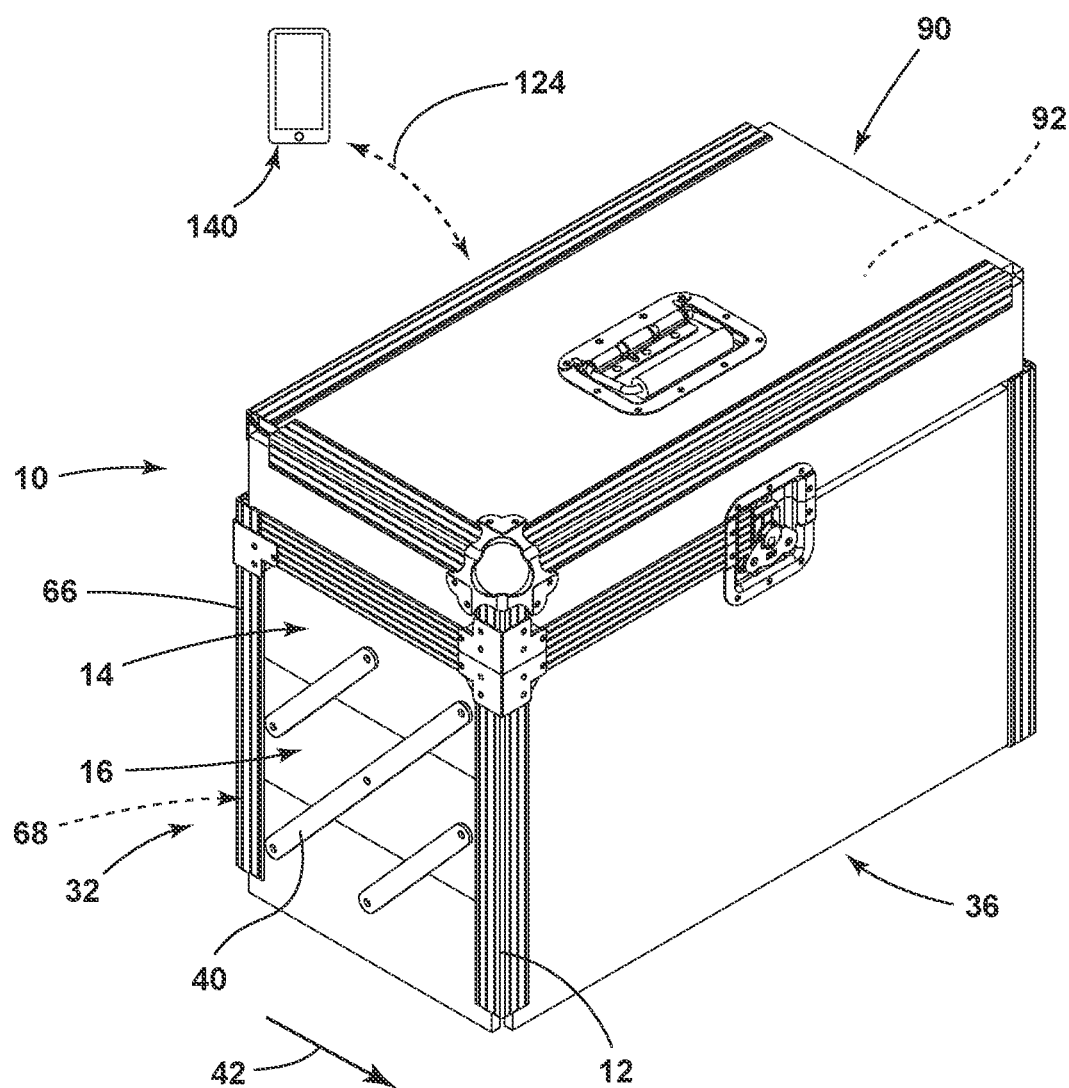
FIG. 5 is a top perspective view of an aspect of the display cabinet of FIG. 1 shown in a closed position.
Figure 6:
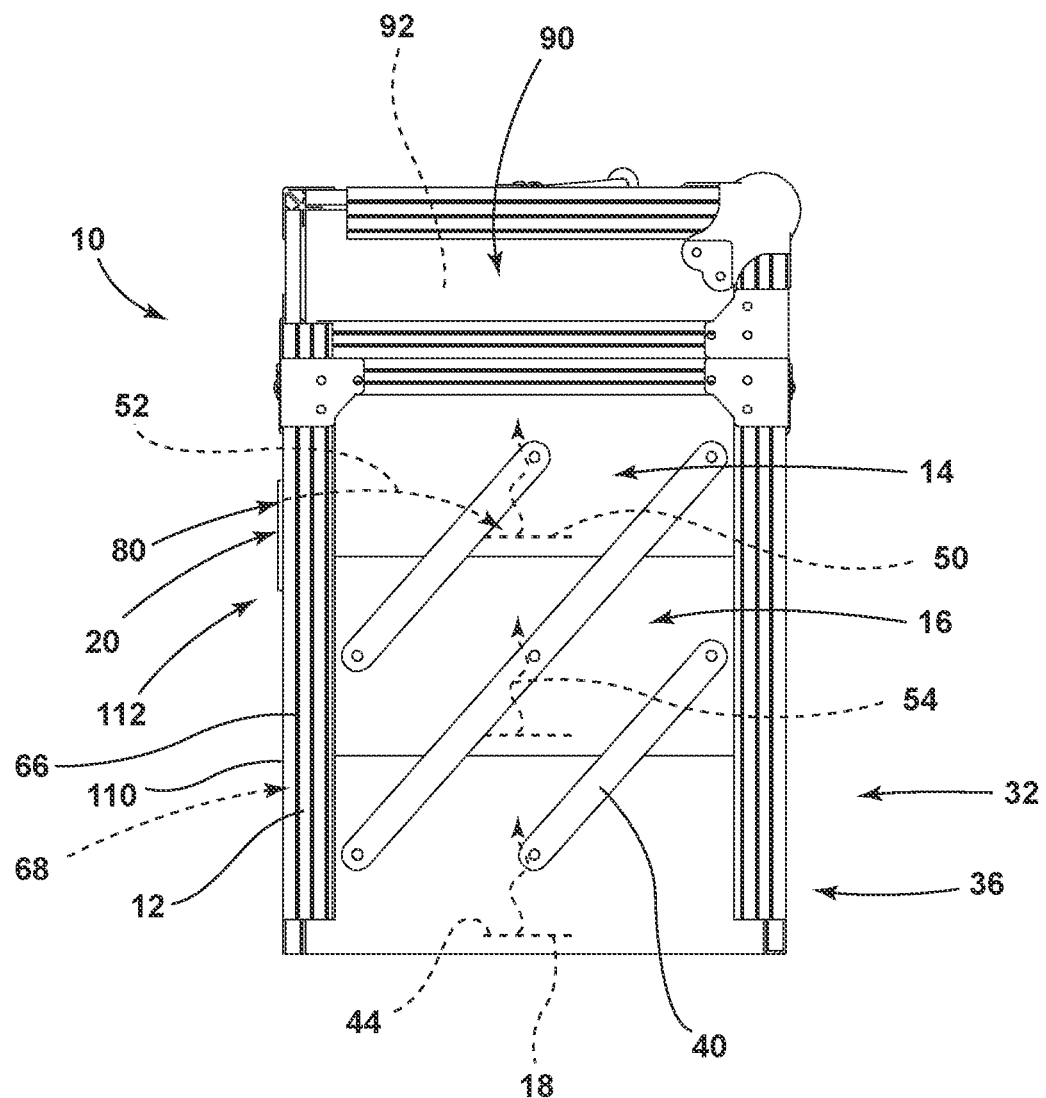
FIG. 6 is a side elevational view of the display cabinet of FIG. 5.
Figure 7:
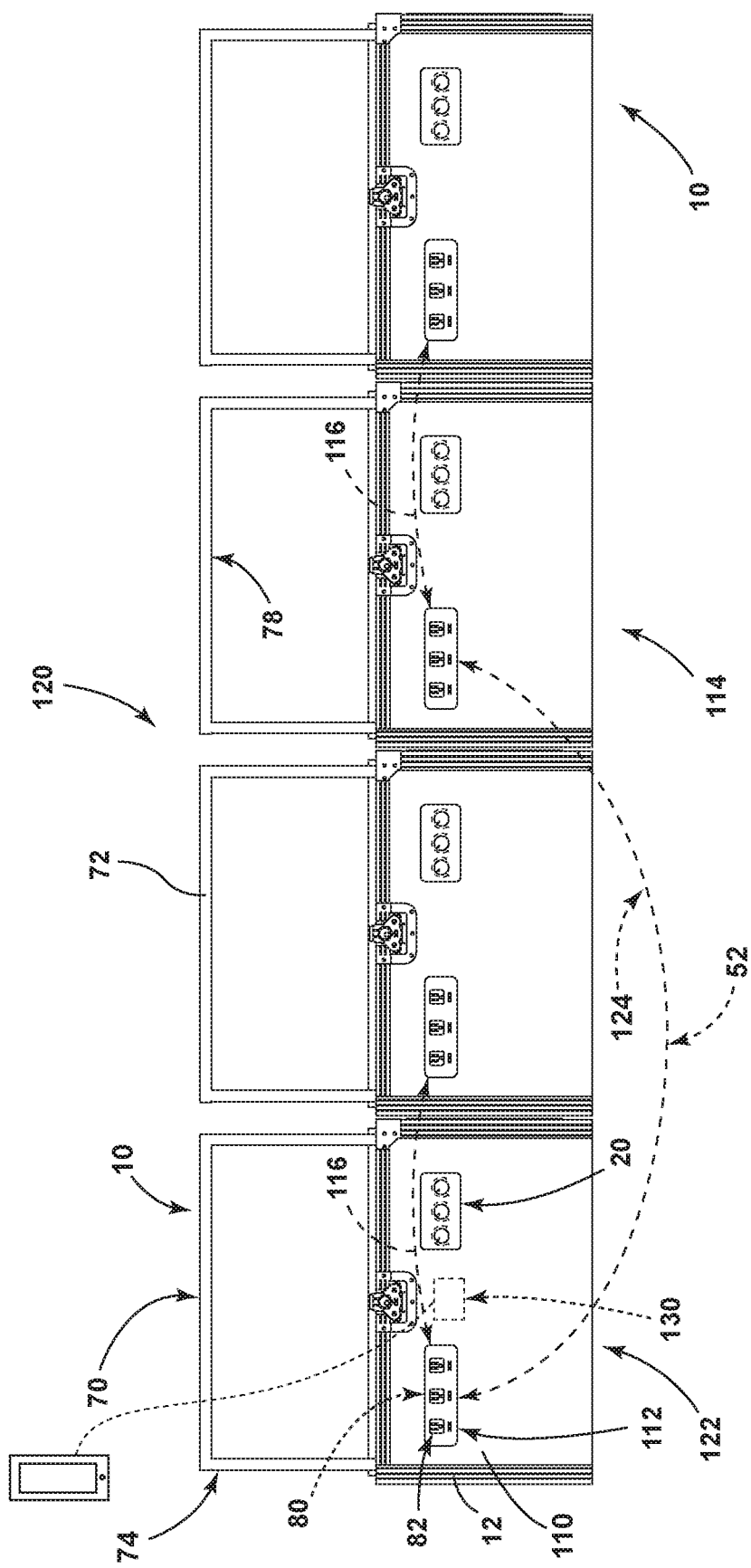
FIG. 7 is a back elevational view of a bank of display cabinets and illustrating a single master cabinet that supports multiple subservient cabinets.

As exemplified in FIGS. 3 and 7, the utility panel 110 can also include one or more electrical receptacles 82 that can be used as an umbilical 116 for connecting to one or more subservient cabinets 114. This umbilical 116 that can extend between various separate display cabinets 10 can transmit electrical current 52 and also transmit data communications 124 via the data communications system 112 for providing power and temperature information to the various heat sources 18 of the various display cabinets 10. The umbilical 116 can also be used to transmit data communications 124 via the data communications system 112 regarding the intensity of light to be used within a particular display cabinet 10.

As exemplified in FIGS. 3 and 7, a plurality of display cabinets 10 can be linked together to form a bank 120 of display cabinets 10. According to various aspects of the device, the bank 120 of display cabinets 10 can include a master cabinet 122 that includes the utility panel 110 having the electrical receptacle 82 and data communications 124 receptacle. Umbilicals 116 can be run from the master cabinet 122 to the subservient cabinets 114 for transmitting electrical current 52 and data communications 124 to each of the subservient cabinets 114. According to various aspects of the device, the master cabinet 122 and the subservient cabinets 114 can be maintained at a consistent temperature and lighting intensity. In such an embodiment, a single controller 130 can be included within the master cabinet 122, where the controller 130 for the master cabinet 122 can be manipulated for setting the heating level and lighting intensity. This heating level and lighting intensity information can be transmitted to each of the subservient cabinets 114. Accordingly, the master cabinet 122 and the subservient cabinets 114 can be maintained at a substantially consistent temperature and lighting intensity for display purposes. This configuration can be useful where a number of living creatures are kept within the bank 120 of display cabinets 10 and where each of these creatures is recommended to be maintained at a substantially similar temperature. By way of example, and not limitation, a bank 120 of display cabinets 10 may be used to store various species of reptiles that are found within a particular region of the world and where similar living temperatures are recommended for each of the species kept within the bank 120 of display cabinets 10. Using the single controller 130 of the master cabinet 122, the temperature can be adjusted and maintained at a recommended level for that particular species or set of species.

In various embodiments, it may also be desirable to individually control separate display cabinets 10. In such an embodiment, the master cabinet 122 can include an individualized controller 130 that can be used to separately and independently control the temperature and lighting intensity for each of the master cabinet 122 and the subservient cabinets 114. It is also contemplated that each individual heat control and lighting control for individual bins 56 and display areas 24 within a particular master cabinet 122 or subservient cabinet 114 can also be achieved through operation of the controller 130. The bank 120 of display cabinets 10 can include integral and matingly configured receptacles that can attach to one another to form the bank 120, while also limiting the use of electrical cords and related wires.

According to various aspects of the device, the various heating and lighting controls for the display cabinet 10 or the bank 120 of display cabinets 10 can be controlled via a portable computing device 140 such as a cell phone, tablet, computer, wearable device, or other similar portable computing device 140. Such controls can be transmitted to the display cabinet 10 and/or bank 120 of display cabinets 10 via a wireless network. Such wireless network can be in the form of a cellular signal, Wi-Fi network, Bluetooth connection, or other similar wireless communications network. Using the portable computing device 140, the various temperatures of the individual display cabinets 10, as well as the individual shelves, bins 56 and display areas 24 within the shelves can be monitored and adjusted. This monitoring and adjustment of the individual display areas 24 can be performed via the portable computing device 140 when the display case is in the open and closed positions 30, 32.

Accordingly, during transport, an individual can monitor, via the portable computing device 140, the various temperatures within the display areas 24 of the display cabinet 10. In such an embodiment, where a display area 24 begins to experience lower temperatures, the user can adjust, via the portable computing device 140, an electrical current 52 delivered to one or more of the resistive heating elements for elevating a particular temperature within a particular display area 24 of the display cabinet 10. Similarly, where a display cabinet 10 is experiencing temperatures that are higher than that of a desirable temperature range, the user can access the heat source 18 to turn off heat source 18 in a particular area. Additionally, the display cabinet 10 can include an internal fan, louvers, or other air handling system for venting hot air away from the display areas 24 within the display cabinet 10. It is also contemplated that the temperature sensors 22 within the display cabinet 10 can be used in conjunction with a control for automatically activating and deactivating the heat source 18 and air handling unit for maintaining a substantially consistent temperature within the display cabinet 10.

According to various aspects of the device, the display cabinet 10 described herein is intended to provide a self-contained environment within which living organisms can be stored, transported and displayed. One of the goals of the display cabinet 10 is to provide a substantially consistent environment within which these living organisms can be accommodated to minimize stresses experienced by the living organisms. By minimizing undesirable movements and temperature fluctuations and other undesirable conditions, the health and safety of the living organisms stored within the display cabinet 10 can be better provided for.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A climate controlled display cabinet comprising:
   a frame having corner supports, the corner supports having stanchion channels defined therein;
   a stationary shelf coupled to the corner supports of the frame;
   a lid that is selectively attached to the frame, wherein the frame, including the corner supports, and the lid form an outer enclosure;
   a plurality of operable shelves coupled to at least one of the frame and the stationary shelf, wherein the plurality of operable shelves are moveable between open and closed positions;
   a lighting structure having a plurality of lighting elements and that is operably coupled to the corner supports of the frame, wherein the lighting structure includes a stanchion that is vertically and slidably operable within the stanchion channels of the corner supports, wherein the lighting structure is stowable on the stationary shelf and within the outer enclosure to further characterize the closed position, the lighting structure being entirely concealed from view within the frame and between the lid and the stationary shelf when in the closed position;
   a heat source in thermal communication with the stationary shelf and the plurality of operable shelves; and
   at least one temperature sensor for monitoring a temperature of an area proximate the stationary shelf and the plurality of operable shelves.

2. The climate controlled display cabinet of claim 1, further comprising:
   a thermostat coupled to the frame and in communication with the heat source and the at least one temperature sensor.

3. The climate controlled display cabinet of claim 2, further comprising:
   a controller in communication with the thermostat and the heat source.

4. The climate controlled display cabinet of claim 3, wherein the controller communicates with the at least one temperature sensor in each of the open and closed positions, and wherein the controller is configured to adjust an electrical current that is delivered to the heat source.

5. The climate controlled display cabinet of claim 3, wherein the heat source is divided into a plurality of independent heating sections, wherein each of the plurality of independent heating sections corresponds to a respective display area of the stationary shelf and the plurality of operable shelves.

6. The climate controlled display cabinet of claim 5, wherein each of the plurality of independent heating sections includes a respective temperature sensor of the at least one temperature sensor.

7. The climate controlled display cabinet of claim 6, wherein the controller is configured to provide independent temperature control for each of the plurality of independent heating sections.

8. The climate controlled display cabinet of claim 3, wherein the frame includes a portable power source that is in communication with the controller, heat source and the at least one temperature sensor.

9. The climate controlled display cabinet of claim 1, wherein the heat source is an electrically resistive heat tape that is disposed on the stationary shelf and each operable shelf of the plurality of operable shelves.

10. The climate controlled display cabinet of claim 1, further comprising:
a plurality of display bins that are selectively positioned on the stationary shelf and each operable shelf of the plurality of operable shelves, respectively, wherein each bin of the plurality of display bins is in thermal communication with the heat source.

11. The climate controlled display cabinet of claim 1, wherein the stationary shelf is visible through a perimeter frame of the lighting structure in each vertical position of the stanchion relative to the stanchion channels.

12. A climate controlled display cabinet for displaying living animals, the climate controlled display cabinet comprising:
a frame having corner supports that are attached to a stationary display portion;
a lid that is selectively attached to the frame and the stationary display portion;
a plurality of operable display portions that are coupled to the frame, wherein the plurality of operable display portions are moveable between open and closed positions, the closed position defined by the stationary display portion and the plurality of operable display portions enclosed within the frame, the open position defined by the stationary display portion and the plurality of operable display portions being accessible;
a heat source in thermal communication with the stationary display portion and the plurality of operable display portions;
a plurality of temperature sensors coupled to the stationary display portion and the plurality of operable display portions, respectively;
a lighting structure having a stanchion that is vertically and slidably operable within stanchion channels that are defined within the corner supports of the frame, wherein the lighting structure is stowable on an outer edge of the stationary display portion, the lighting structure configured to rest on an outer edge of the stationary display portion and maintain visibility into the stationary display portion through the lighting structure, and wherein the closed position is further defined by the lighting structure being positioned and entirely concealed between the lid, the corner supports and the stationary display portion; and
a controller having a user interface in communication with the lighting structure, the plurality of temperature sensors and the heat source, wherein the controller communicates respective signals from each temperature sensor of the plurality of temperature sensors, wherein the controller and the user interface are configured to be connected with a plurality of subservient cabinets and are selectively operable to control subservient heating elements of the plurality of subservient cabinets.

13. The climate controlled display cabinet of claim 12, wherein the respective signals are communicated in each of the open and closed positions, and wherein the controller is configured to adjust an electrical current that is delivered to the heat source in each of the open and closed positions.

14. The climate controlled display cabinet of claim 12, wherein the heat source is an electrically resistive heat tape that is adhered to the stationary display portion and the plurality of operable display portions, respectively.

15. The climate controlled display cabinet of claim 12, further comprising:
a plurality of display bins that are selectively positioned on the stationary display portion and the plurality of operable display portions, respectively, wherein each bin of the plurality of display bins is in thermal communication with the heat source.

16. A climate controlled display cabinet comprising:
a frame having corner supports with internal stanchion channels;
a lid that is selectively attached to the frame;
a stationary shelf coupled to the frame;
a plurality of operable shelves coupled to at least one of the frame and the stationary shelf, wherein the plurality of operable shelves are moveable between open and closed positions;
a lighting structure that is operably coupled to the corner supports of the frame, wherein the lighting structure includes a stanchion that is vertically and slidably operable within the internal stanchion channels of the corner supports, and wherein the lighting structure is stowable on top of an upper edge of the stationary shelf, the stationary shelf being visible through the lighting structure, the closed position further characterized by the lighting structure being concealed between the frame, the corner supports, the lid and the stationary shelf;
a heat source in thermal communication with the stationary shelf and the plurality of operable shelves, wherein each of the stationary shelf and the plurality of operable shelves includes a heating section of the heat source in the form of electrically resistive tape;
at least one temperature sensor coupled to each of the heating sections, wherein the at least one temperature sensor monitors a temperature of an area proximate a respective heating section of the heating sections;
a thermostat coupled to the frame and in communication with the heat source and the at least one temperature sensor; and
a controller having a user interface that is in communication with the lighting structure, the thermostat and the heat source, wherein the controller operates the heating sections in each of the open and closed positions of the plurality of operable shelves, wherein the controller and the user interface are configured to be selectively connected with a plurality of subservient cabinets, and wherein the controller and the user interface are selectively operable to deliver electrical current to corresponding subservient heating elements of the plurality of subservient cabinets.

17. The climate controlled display cabinet of claim 16, wherein the controller communicates a signal from the at least one temperature sensor in each of the open and closed positions, and wherein the controller is configured to adjust an electrical current that is delivered to the heat source.

18. The climate controlled display cabinet of claim 16, further comprising:
   a plurality of display bins that are selectively positioned on the stationary shelf and each operable shelf of the plurality of operable shelves, respectively, wherein each bin of the plurality of display bins is in thermal communication with the heat source.

* * * * *

UNITED STATES PATENT AND TRADEMARK OFFICE
CERTIFICATE OF CORRECTION

| | | |
|---|---|---|
| PATENT NO. | : 11,484,132 B2 | |
| APPLICATION NO. | : 16/527715 | |
| DATED | : November 1, 2022 | |
| INVENTOR(S) | : Jim Ward | |

It is certified that error appears in the above-identified patent and that said Letters Patent is hereby corrected as shown below:

In the Specification

Column 2, Line 67:
"endothermy" should be -- endotherms --.

Signed and Sealed this
Seventeenth Day of September, 2024

Katherine Kelly Vidal
*Director of the United States Patent and Trademark Office*